United States Patent Office 3,045,983
Patented July 24, 1962

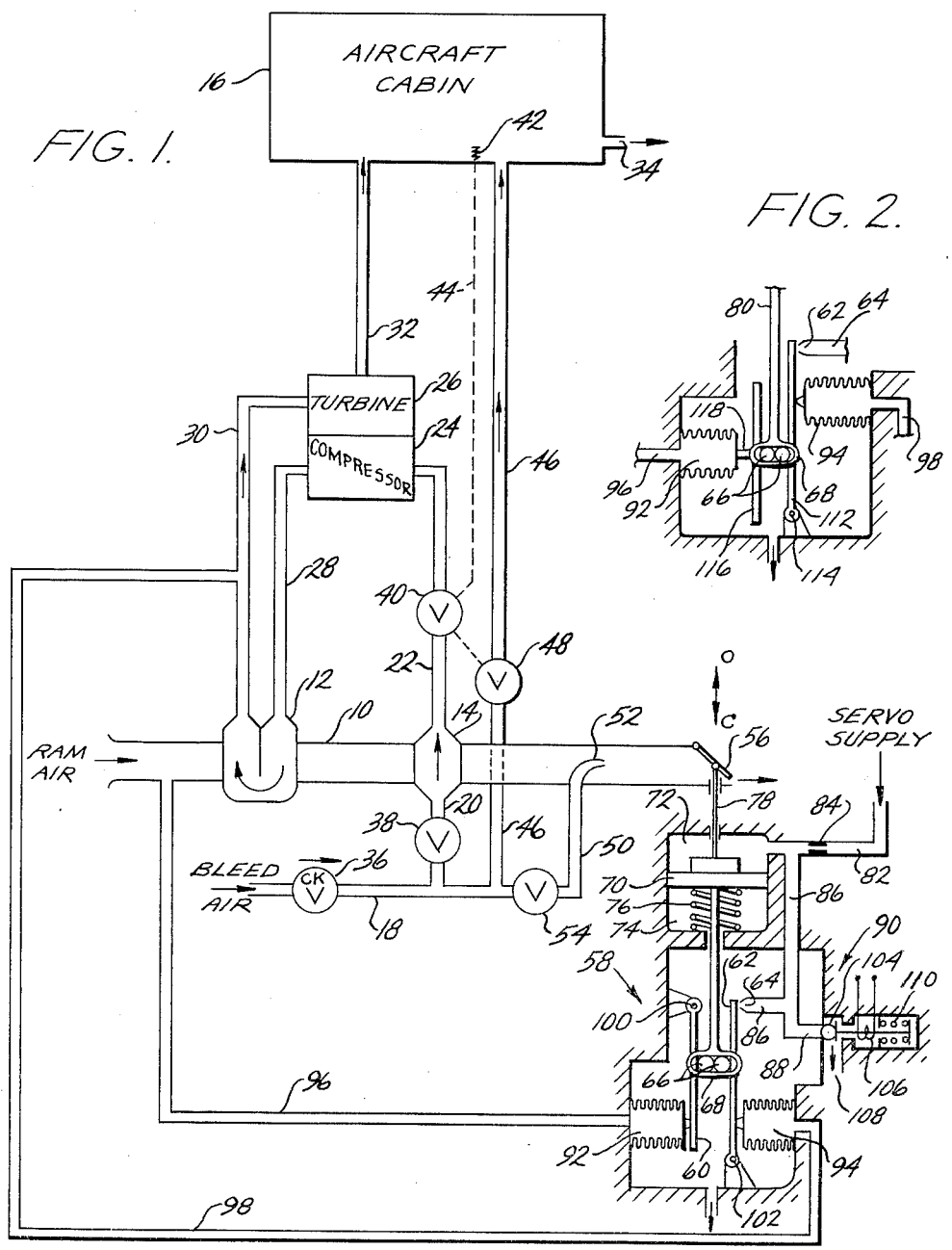

3,045,983
RAM AIR CONTROL FOR AIRCRAFT AIR CONDITIONING SYSTEM
Stanley G. Best, Manchester, Conn., assignor to United Aircraft Corporation, East Hartford, Conn., a corporation of Delaware
Filed May 15, 1958, Ser. No. 735,638
17 Claims. (Cl. 257—276)

This invention relates to improvements in aircraft air conditioning systems of the general type which are adapted to use ram air as a cooling medium in a heat exchanger. Within this general class of systems are those wherein the ram air is in direct but out of contact heat transfer relationship with the air flowing to the aircraft cabin and compartments, and this general class also includes systems wherein there is indirect heat transfer between the ram air and the air supply for the cabin as when the ram air cools some intermediate medium in out of contact heat transfer and which medium in turn cools the cabin supply air.

In all such systems, the amount of ram air flow required is dependent upon the cooling requirements of the air being supplied to the cabin and other compartments, and it is the general object of this invention to provide means for automatically controlling the quantity of ram air flow in accordance with the cooling requirements of the cabin and compartment supply air as said cooling requirements are determined by the amount of flow and the pressure of said cabin and compartment supply air.

In fulfilling this general object of the invention, ram air flow is controlled so as to satisfy but not exceed the cooling requirements of the air supply for the cabin and compartments under conditions of aircraft operation wherein ram air flow in excess of the amount required to meet said cooling requirements would otherwise occur and, as a result, a substantial reduction in unnecessary drag on the aircraft is accomplished and considerable improvement in overall performance of the aircraft is realized.

Another object of the invention is to provide a valve and control means therefor adapted to regulate the amount of ram air flow whereby to control the ratio of ram air flow to cabin and compartment supply air flow, which valve and control means are operable responsive to the pressure of the ram air and to the pressure of the cabin and compartment supply air.

Another and a more specific object of the invention is to provide a control system which is operable responsive to a pressure ratio to regulate the position of a valve or the like in accordance with said pressure ratio.

Still another specific object of the invention is to provide a ratio sensitive device which, in addition to being readily adaptable for use in regulating the position of a valve is adaptable for a wide variety of other uses.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a schematic illustration of an aircraft air conditioning system wherein engine compressor bleed air is utilized as the supply air for an aircraft cabin and wherein ram air is utilized as a cooling medium for some of the bleed air and the view also schematically illustrates the valve and control means for regulating the ratio of ram air flow to bleed air flow, and;

FIG. 2 schematically illustrates an alternative construction of a fluid pressure ratio sensitive device.

Heat exchange means adapted to transfer heat from the supply air for an aircraft cabin and compartments to ram air is provided in accordance with the present invention and while said means may include an intermediate medium, such as one of the common refrigerants, for absorbing heat from the supply air and for, in turn transferring said heat to the ram air, heat transfer from cabin and compartment supply air to ram air is accomplished directly in the exemplary air conditioning system shown in the drawing, means being included therein for establishing direct but out of contact heat exchange relationship between said ram and supply air. Air passage means adapted to receive a flow of ram air and to discharge said air overboard of the aircraft is included in said heat exchange means and said air passage means may comprise a conduit 10 which receives air at one end thereof from outside of the aircraft and directs said air through first and second heat exchangers 12 and 14 and which then discharges said air overboard of the aircraft.

Air bled from the compressor of the aircraft engine is utilized as the supply air for an aircraft cabin 16 in the air conditioning system shown and said air is introduced to said air conditioning system through a conduit 18 communicating with a conduit 20 which extends therefrom to the second heat exchanger 14. In the heat exchanger 14, which may be of any well-known air-to-air type suitable for aircraft use, a portion of the heat contained in the engine bleed air, which is at a relatively high pressure and temperature when introduced to the air conditioning system, is transferred to the ram air flowing through said heat exchanger and the engine bleed air is then discharged to a conduit 22 which extends from the heat exchanger 14 to a compressor 24. The compressor 24, which is driven by a turbine 26 in a bootstrap arrangement, discharges the bleed air, after further pressurizing said air, to a conduit 28 which extends from said compressor to the first heat exchanger 12. After further cooling in the heat exchanger 12, the engine bleed air is passed to the turbine 26 through a conduit 30 connected between said heat exchanger and said turbine. Expansion of the engine bleed air in the turbine 26 results in a further reduction in the temperature thereof whereupon introduction of said air to the cabin 16 is accomplished through a conduit 32 which interconnects said cabin with the turbine 26. The cooled engine bleed air supplied to the cabin 16 from the conduit 32 is discharged therefrom through a discharge port 34 and may be passed overboard of the aircraft or, the air discharged through the port 34 may be supplied to other compartments or devices, not shown, which require cooling. In addition to supplying the cabin 16 with cooled engine bleed air, the conduit 32 may also supply a cooling air stream directly to other compartments and devices requiring air conditioning, and it is to be understood that when "cabin supply air" and "air supplied to the cabin" and similar terms and phrases are used hereinafter, the term cabin is used representatively and is to be interpreted as including other compartments and devices which may be supplied with a cooling air stream.

Also included in the portion of the air conditioning system supplying cooling air to the cabin is a check valve 36 which is disposed in the conduit 18 and operable to prevent a reverse flow of air therethrough from the air conditioning system to the engine compressor, an on-off valve 38 disposed in the conduit 20 and which may be remotely operable by the aircraft pilot for selectively preventing the flow of a cooling air stream to the cabin, and a cabin temperature control valve 40 disposed in the conduit 22. The cabin temperature control valve 40 is preferably automatically operable responsive to cabin temperature for regulating the flow of cooling air to said cabin so as to maintain a desired temperature therewithin. A temperature sensitive element 42 for controlling the valve 40 is disposed in the cabin 16 and is connected to said valve as indicated schematically by the broken line 44.

Another portion of the exemplary air conditioning system shown is adapted for supplying a flow of warming air to the cabin 16 and this portion of the system includes a conduit 46 which communicates with the engine bleed air supply conduit 18 and which extends therefrom to the cabin 16. Disposed in the conduit 46 is a valve 48 which is operable to control the flow of warming air through said conduit responsive to temperature within the cabin 16. The operation of the valve 48 may be coordinated with the operation of the aforementioned valve 40, said two valves 40 and 48 being operable under the control of the cabin located temperature sensitive element 42.

Under some anticipated conditions of aircraft operation, such as low speed flight and ground running, the flow of ram air may be inadequate for cooling the engine bleed air supplied to the cabin. To meet this contingency, pumping means is provided in the air conditioning system in association with the ram air conduit 10. A conduit 50 communicating with the engine bleed air supply conduit 18 extends therefrom to a jet nozzle or pump 52 which is located in the ram air conduit 10 downstream of the heat exchangers 12 and 14. Disposed in the conduit 50 is a valve 54 which is operable selectively to allow a flow of high pressure engine bleed air from the conduit 18 to pass to the jet pump 52 through said conduit. The valve 54 may be remotely controlled by the aircraft pilot.

Under other anticipated conditions of aircraft operation, and especially during high speed flight of the aircraft, the flow of ram air may be more than is required to satisfy the cooling requirements of the engine bleed air supplied to the cabin and when excessive ram air flow occurs, excessive and unnecessary drag on the aircraft results and overall performance of the aircraft is penalized. In accordance with the present invention, valve means are provided for automatically controlling the flow of ram air in accordance with the cooling requirements of the air supplied to the cabin whereby to avoid excessive ram air flow and the undesirable consequences thereof. In the preferred embodiment of the invention shown in the drawing and described hereinafter, said valve means includes a valve 56 disposed in the ram air conduit 10 and movable therein between open and closed positions for controlling the flow of ram air therethrough and through the heat exchangers 12 and 14. The said valve means also includes control means, indicated generally by the reference numeral 58, adapted automatically to vary the position of the valve 56. The valve 56 is preferably disposed in the conduit 10 at the discharge end thereof so as to constitute with said conduit end a variable area nozzle. With the valve 56 disposed in such manner at the discharge end of the conduit 10, said conduit may, under some conditions of aircraft operation, take on the characteristics of a ram jet, and the air discharged therefrom may result in a small amount of net thrust rather than causing drag on the aircraft.

In preferred form, the control means 58 comprises a mechanism which is operable to position the valve 56 in keeping with the ratio of ram air pressure to cabin supply air pressure. It will be seen that ram air pressure measured near the inlet end of the conduit 10 will be determined principally by the speed of the aircraft and the altitude of operation thereof and that said pressure will provide an indication of available ram air flow. That is, if the valve 56 were to remain in a wide open position, the quantity of ram air flowing through the conduit 10 would vary in keeping with said ram air pressure. Since the resistance to flow downstream of the cabin temperature control valve 40 remains substantially constant, the cabin supply air pressure downstream of said valve indicates the amount of air actually flowing to the cabin. Thus, the ratio of ram air pressure to cabin supply air pressure occurring under a particular condition of aircraft operation indicates the ratio of ram air flow to supply air flow which would occur under that condition of operation if control over ram air flow were not effected by the valve 56 and the control mechanism 58.

In adjusting the position of the valve 56 in keeping with the ram air to supply air pressure ratio, the control mechanism 58 establishes a discrete position of said valve for each pressure ratio occurring. Thus, a preselected portion of available ram air flow is allowed to pass through the conduit 10 for each ram air to supply air pressure ratio which occurs. It will be apparent that if the portion of available ram air flow which is allowed to pass through the conduit 10 is suitably varied over the range of ram air to supply air pressure ratios which may be expected to occur, the ratio of actual ram air flow to supply air flow may be maintained at a substantially constant level. For example, when a relatively high ratio of ram air pressure to supply air pressure occurs, indicating a high ratio of available ram air flow to cabin supply air flow, the valve 56 will be positioned by the control mechanism 58 so as to allow only a small portion of the available ram air flow to pass through the conduit 10. When the ram air to supply air pressure ratio is lower, indicating a lower ratio of available ram air flow to cabin supply air flow, the control mechanism 58 will adjust the position of the valve 56 to a more open attitude whereby to allow a larger portion of the available ram air flow to pass through the conduit 10. Finally, when the pressure ratio indicates a ratio of available ram air flow to cabin supply air flow which is substantially equal to or less than the desired constant ratio, the control mechanism 58 will fully open the valve 56 so as to allow all of the available ram air flow to pass through the conduit 10.

Preferably, the control mechanism 58 for the main air valve 56 comprises a ratio sensitive device including at least one lever supported for pivotal movement about a fixed axis and which is respectively urged in opposite directions by first and second force means. When the device is sensitive to a fluid pressure ratio, the first and second force means comprise means responsive to a first fluid pressure and means responsive to a second fluid pressure. Also included in the device is means movable along the lever for varying the point of application to said lever of the force exerted by one of the fluid pressure responsive means. The position of said movable means is adjusted by means operable by the lever so as to balance the effective lever moments. Thus, the position of the said movable means is indicative of the ratio of the fluid pressures sensed by the fluid pressure responsive means. The position of the valve 56 is adjusted in keeping with the position of said movable means by the foresaid lever operated means and is thus positioned in keeping with the pressure ratio.

The means operable by the lever for adjusting the position of the valve 56 and the position of the means movable along the lever comprises, in preferred form, a pneumatic actuator. There is preferably provided a pair of levers 60 and 62 and the operating pressure in the pneumatic actuator is controlled by movement or displacement of said levers, one of the levers being utilized to control the effective size of a vent orifice 64 for the valve actuator. The levers 60 and 62 are arranged in generally parallel relationship and are preferably of substantially equal length, each lever being pivotally supported at one end and the pivotal support for one lever being at the end opposite to the support for the other lever. The levers 60 and 62 are operatively associated or connected so that when one is moved clockwise, the other is moved counterclockwise and vice versa. The means effecting such operative association preferably includes a pair of rollers 66, 66 which are supported within a cage or bracket 68 so that said rollers engage each other in side-by-side relationship between the levers 60 and 62 and so that the respective rollers engage the levers. The cage structure 68 supporting the rollers is connected with the ram air valve actuator so as to be moved or adjusted with movement or adjustment of the ram air valve 56, the movement of the cage effecting movement of the rollers 66, 66 along the levers 60 and 62. A fluid pressure responsive means engages each of the levers 60 and 62 on the side thereof opposite the rollers 66, 66 and said means are respectively operable responsive to ram air pressure and supply air pressure for urging said levers in opposite directions.

The pneumatic actuator of the control mechanism preferably comprises a piston 70 having a chamber 72 on one side thereof adapted to receive a supply of air under pressure. On the opposite side of the piston 70 there is provided a second chamber 74 containing air at atmospheric pressure and in said second chamber there is disposed a spring 76 for urging the piston 70 in opposition to the pressure of the air in the chamber 72. A connecting member or link 78 extends from the piston 70 to the ram air valve 56 for adjusting the position of said valve in accordance with the position of said piston. A second connecting member or rod 80 extending from the piston 70 is attached at its opposite end to the cage 68 whereby to provide for adjustment of the position of said cage and the rollers 66, 66 supported thereby along the levers 60 and 62 in accordance with the position of the piston 70.

Communicating with the chamber 72 and extending therefrom is a conduit 82 which is adapted to receive a supply of servo air. Disposed in the conduit 82 is a restriction 84 and extending from said conduit between the restriction 84 and the chamber 72 is a conduit 86. Located at the free end of the conduit 86 adjacent the lever 62 is the vent orifice 64, and connected to the conduit 86 between the orifice 64 and the junction of said conduit with the conduit 84 is a conduit 88 which extends therefrom to an override device 90. The construction and operation of the override device 90 will be described more fully hereinafter, and it may be assumed, for the present, that said device and the conduit 88 extending thereto have no effect on operation of the control mechanism.

It will be seen that the effective size of the orifice 64 is determined by the position of the lever 62 adjacent thereto. In turn, the effective size of the orifice 64 determines the amount of flow of servo air therethrough and the pressure drop across the restriction 84 in the line 82. Thus, if the pressure of the servo air received by the conduit 82 is substantially constant, the pressure within said conduit downstream of the restriction 84, the pressure in the conduit 86 and the pressure within the actuator chamber 72 will be determined by the position of the lever 62 with respect to the orifice 64. If the lever 62 is positioned with respect to said orifice so as to provide a relatively large effective size thereof, the pressure within the said conduits and in the chamber 72 will be relatively low and, conversely, if the lever 62 is positioned so as to provide a relatively small orifice size, the pressure of the air in the actuator chamber 72 will be relatively high. The pressure of the air in the chamber 72, which chamber may be hereinafter referred to as a control chamber, determines the position of the piston 70 and, thus, the position of the valve 56 and the cage 68 and rollers 66, 66. The manner in which the position of the lever 62 is controlled relative to the vent orifice 64 will be described hereinbelow.

The fluid pressure responsive means which act on the levers 60 and 62 comprise, in preferred form, a bellows 92 and a bellows 94. The bellows 92 is connected to the ram air conduit 10 near the inlet end of said conduit by a conduit 96. A force proportional to the ram air pressure is thus exerted on the lever 60 by the bellows 92 and tends to urge said lever in a counterclockwise direction about a first fixed axis at a support 100 which is located at one end of said lever. Cabin supply air from the conduit 30 which interconnects the heat exchanger 12 and the turbine 26 is directed to the bellows 94 through a conduit 98. Said bellows is thereby expanded against the lever 62 whereby to urge said lever in a counterclockwise direction about a second fixed axis at a support 102, which is located at the end of said lever which is opposite the support 100 for the lever 60. The rollers 66, 66 are preferably movable in the cage 68 and engage the levers 60 and 62 at all times. Thus, when one of the levers 60 and 62 is moved clockwise about its axis, the other of said levers is moved counterclockwise about its axis and vice versa. Movement of the levers 60 and 62 is very slight and it may, therefore, be said that said levers remain in generally parallel relation at all times.

With the levers 60 and 62 and the cage 68 and rollers 66, 66 in the positions shown in the drawing, an increase in the ratio of ram air pressure to supply air pressure, as from an increase in aircraft speed causing ram pressure to rise, will result in an increase in the force exerted by the bellows 92 whereupon the opposing force exerted by the bellows 94 will be overcome and the lever 60, the rollers 66, 66 and the lever 62 will be moved. The lever 60 will be rotated in a counterclockwise direction, the rollers 66, 66 will be displaced rightwardly from the positions in which they are shown, and the lever 62 will be rotated about its support 102 in a clockwise direction. A reduction in the effective size of the orifice 64 will result from such movement of the lever 62 causing a corresponding increase in the pressure of the air in the control chamber 72. The piston 70 will thereupon be moved downwardly moving the valve 56 toward its closed position and also moving the cage 68 and the rollers 66, 66 downwardly.

As the rollers 66, 66 are moved downwardly, the effect of the force exerted by the bellows 94 on the lever 62, the rollers 66, 66 and the lever 60 will be progressively increased. The effect of the force exerted by the bellows 92 on the lever 60, the rollers 66, 66 and the lever 62, on the other hand, will be progressively decreased as the rollers 66, 66 are moved downwardly. When the rollers 66, 66 reach a position wherein the lever moments are balanced, the control mechanism will reach equilibrium condition and the lever 62 will occupy a new position adjacent the orifice 64. The size of the orifice 64 will be decreased as will the amount of flow therethrough and an increased pressure in the control chamber 72 will be established. The piston 70 will be positioned downwardly with respect to its initial position as will the cage 68 and the rollers 66, 66. The valve 56 will occupy a more closed position whereby to allow passage of a smaller portion of the available ram air flow through the conduit 10.

Operation of the control mechanism 58 responsive to a decrease in the ram air to supply air pressure ratio is similar to that described above but in an opposite sense. The levers 60 and 62 are rotated in a clockwise and counterclockwise direction, respectively, causing an increase in effective size of the orifice 64 and a decrease in the pressure of the air in the control chamber 72. The piston 70 is then moved upwardly carrying the cage 68 and rollers 66, 66 therewith and opening the ram air valve 56. When the rollers 66, 66 have been moved a sufficient distance to balance the moments on the levers 60 and 62, the mechanism will reach equilibrium with an increased area of the orifice 64, a decreased pressure in the control chamber 72 and an increased opening of the ram air valve 56 allowing a larger portion of the then available ram air flow to pass through the conduit 10.

The override device 90 is operable to insure movement of the ram air valve 56 to its fully open position upon operation of the jet pump or nozzle 52 disposed in the ram air conduit 10. In preferred form, the override device 90 comprises a valve 104 disposed in the conduit 88 and which is positioned by a solenoid 106. The solenoid 106 may be remotely controlled by the aircraft operator or said solenoid may be coordinated with the valve 54 supplying air to the jet nozzle 52 so as to be automatically operated to open the valve 104 when the valve 54 is opened. When the valve 104 is opened, it connects the conduit 88 with an atmospheric vent 108 whereupon the pressure of the air in the conduit 86 and in the control chamber 72 is reduced to atmospheric level. The piston 70 is then urged upwardly by the spring 76 to fully open the ram air valve 56. Also included in the override device 90 is a biasing spring 110 which urges the valve 104 toward its open position so as to insure that the valve 56 will be moved to the open position in the event of failure of the solenoid 106.

In the alternative construction of the control mechanism 58 a fluid pressure ratio sensitive device is provided wherein a single pivotally supported lever 112 is utilized. A fixed pivotal support 114 for the lever is preferably located at one end thereof. A member 116, which may be a longitudinal bar or a plate, extends generally parallel with and in spaced relation with the lever 112 and is movable bodily transversely with respect to the said lever. The lever 112 and the member 116 are operatively associated so that the member moves in one direction when the lever moves clockwise about its axis and in an opposite direction when the lever moves counterclockwise about its axis. The means effecting such operative association comprises the rollers 66, 66 and the roller cage 68. The rollers 66, 66 are moved along the member 116 and the lever 112 by the connecting rod 80 as in the dual-lever construction described above. The vent orifice 62 for the valve actuator is disposed adjacent the lever 112 so that the effective size of said orifice will be controlled by movement or displacement of the said lever.

The fluid pressure responsive means comprising the bellows 94 receiving cabin supply air through the conduit 98 urges the lever 112 and member 116 in one direction while the bellows 92 receiving ram air through the conduit 96 urges said lever and member in an opposite direction. The member 116 is preferably carried by the bellows 92 as shown, a connecting link 118 attached to the free end of said bellows being rigidly secured to the said member. The member 116, of course, may be otherwise connected with the bellows 92.

Operation of the alternative fluid pressure ratio sensitive device of FIG. 2 is quite similar to that of the dual-lever construction of FIG. 1 and therefore, only a brief description thereof is necessary. If, for example, the ram air to cabin supply air ratio increases with the device in equilibrium at the positions shown in FIG. 2, the force exerted by the bellows 92 will overcome the force of the bellows 94 to move the member 116 and the rollers 66, 66 rightwardly. The lever 112 will be rotated clockwise so as to decrease the effective area of the orifice 62. This will cause the valve actuator to move the valve 56 toward its closed position and the rod 80 will move the rollers 66, 66 downwardly along the member 116 and lever 112. As the rollers 66, 66 move downwardly the effect of the force exerted by the bellows 92 on the lever 112 will be decreased by virtue of the adjustment of the point of application of said force to the said lever toward the pivot 114. When the effective lever moments are balanced, the device will come to rest in an equilibrium condition with the rollers 66, 66 and the valve 56 positioned in keeping with the ram air to supply air pressure ratio. By reason of the adjustment of the valve 56 to a more closed position, the portion of available ram air flow which will be allowed to pass through the conduit 10 will be reduced.

Operation responsive to a decrease in the ram air to cabin supply air pressure ratio is similar but, of course, in an opposite sense, the portion of available ram air flow being allowed to pass through the conduit 10, in this instance, being increased.

From the foregoing, it will be apparent that while the control mechanism of this invention has been described herein and is illustrated in the drawing as providing a constant ratio of ram air flow to cabin supply air flow, said control mechanism may be readily adapted to vary the ratio of ram air flow to cabin supply air flow responsive to the ram air to supply air pressure ratio. That is, the control mechanism 58 may be adapted to schedule the position of the ram air valve 56 responsive to the ram air to supply air pressure ratio so as to establish a variety of desired relationships between the ram air to supply air flow ratio and the ram air to supply air pressure ratio. In some air conditioning systems, it may be desirable to establish, for example, rather than a constant ram air to supply air flow ratio, relatively high ram air to supply air flow ratios for conditions of aircraft operation wherein ram air to supply air pressure ratios are relatively high and to establish relatively low flow ratios for aircraft operating conditions wherein said pressure ratios are lower. In other air conditioning systems, it may be determined that still other relationships between the ram air to supply air pressure ratio and the ram air to supply air flow ratio are required for efficient overall system operation.

Another aspect of the present invention to be considered is the general utility of both the preferred and the alternative constructions of the ratio sensitive device. It will be seen that the said device is adaptable for a wide variety of uses. While a pneumatic valve actuator is herein included in the device, a wide variety of other means might be operated by a movement of, or a force exerted by, a lever, such as the lever 62 or 112, to adjust the position of movable means, such as the rollers 66, 66, and in addition, to perform some other useful function responsive to a ratio, such as a pressure ratio.

The invention claimed is:

1. In an aircraft air conditioning system wherein ram air is utilized to cool air which is supplied to the cabin, cabin supply air passage means, heat exchange means adapted to transfer heat from the supply air for the cabin to the ram air which means includes air passage means adapted to receive a flow of ram air and to discharge said air, valve means associated with said ram air passage means, and valve control means connected with said cabin supply air passage means and said ram passage means and operable automatically to control the flow of ram air through said heat exchange means whereby to regulate the ratio of ram air flow to cabin supply air flow.

2. In an aircraft air conditioning system wherein ram air is utilized to cool air which is supplied to the cabin, cabin supply air passage means, heat exchange means for transferring heat from the supply air for the cabin to the ram air which means includes air passage means adapted to receive a flow of ram air and to discharge said air, a variable area nozzle associated with the discharge end of said air passage means, and control means for said variable area nozzle connected with said cabin supply air passage means and said ram air passage means and operable automatically to vary the area thereof whereby to control the flow of ram air through said heat exchange means and to thereby regulate the ratio of ram air flow to cabin supply air flow.

3. In an aircraft air conditioning system wherein ram air is utilized to cool air which is supplied to the cabin, heat exchange means adapted to transfer heat from the supply air for the cabin to the ram air which means includes air passage means adapted to receive a flow of ram air and to discharge said air, a valve movable in said air passage means for controlling the flow of ram air therethrough, and valve control means operable automatically responsive to the pressure of the ram air and to the pressure of the cabin supply air for adjusting the position of said valve whereby to regulate the ratio of ram air flow to cabin supply air flow.

4. In an aircraft air conditioning system wherein ram air is utilized to cool air which is supplied to the cabin, heat exchange means adapted to transfer heat from the supply air for the cabin to the ram air which means includes air passage means adapted to receive a flow of ram air and to discharge said air, a valve movable in said air passage means for controlling the flow of ram air therethrough, and a valve control mechanism including a pneumatic actuator and a pressure ratio sensitive device operable responsive to ram air pressure and supply air pressure to control the operating pressure in said actuator whereby to position said valve in accordance with the ratio of said pressures and thereby to regulate the ratio of ram air flow to cabin supply air flow in keeping with said pressure ratio.

5. In an aircraft air conditioning system wherein ram air is utilized to cool air which is supplied to the cabin, heat exchange means adapted to transfer heat from the supply air for the cabin to the ram air which means includes air passage means adapted to receive a flow of ram air and to discharge said air, a valve movable in said air passage means for controlling the flow of ram air therethrough, a pneumatic actuator for controlling the position of said valve, means defining a vent orifice the effective size of which determines the operating pressure in said actuator and the position of said valve, and lever means movable responsive to ram air pressure and to cabin supply air pressure to vary the effective size of said orifice whereby to position said valve in accordance with the ratio of said pressures and thereby to regulate the ratio of ram air flow to cabin supply air flow in keeping with said pressure ratio.

6. In an aircraft air conditioning system wherein ram air is utilized to cool air which is supplied to the cabin, heat exchange means adapted to transfer heat from the supply air for the cabin to the ram air which means includes air passage means adapted to receive a flow of ram air and to discharge said air, a valve movable in said air passage means for controlling the flow of ram air therethrough, a pneumatic actuator for controlling the position of said valve, means defining a vent orifice the effective size of which determines the operating pressure in said actuator and the position of said valve, pivotally supported first and second levers operatively associated so that when one of said levers moves clockwise the other of said levers moves counterclockwise, means movable along the length of said levers effecting the operative association between said levers, means responsive to cabin supply air pressure urging said levers in one direction, and means responsive to ram air pressure urging said levers in the opposite direction, one of said levers being operable to vary the effective size of said orifice whereby to position said valve in accordance with the ratio of ram air pressure to supply air pressure and thereby to regulate the ratio of ram air flow to cabin supply air flow in keeping with said pressure ratio.

7. In an aircraft air conditioning system wherein ram air is utilized to cool air which is supplied to the cabin, heat exchange means adapted to transfer heat from the supply air for the cabin to the ram air which means includes air passage means adapted to receive a flow of ram air and to discharge said air, a valve movable in said air passage means for controlling the flow of ram air therethrough, a pneumatic actuator for controlling the position of said valve, means defining a vent orifice the effective size of which determines the operating pressure in said actuator and the position of said valve, pivotally supported first and second levers operatively associated so that when one of said levers moves clockwise the other of said levers moves counterclockwise, movable means effecting the operative association between said levers which means is connected to said actuator for movement along the length of said levers, means responsive to cabin supply air pressure urging said levers in one direction, and means responsive to ram air pressure urging said levers in the opposite direction, one of said levers being operable to vary the effective size of said orifice whereby to position said valve in accordance with the ratio of ram air pressure to supply air pressure and thereby to regulate the ratio of ram air flow to cabin supply air flow in keeping with said pressure ratio and said movable means being moved by said actuator along said levers to balance the effective lever moments.

8. In an aircraft air conditioning system wherein ram air is utilized to cool air which is supplied to the cabin, heat exchange means adapted to transfer heat from the supply air for the cabin to the ram air which means includes air passage means adapted to receive a flow of ram air and to discharge said air, a valve movable in said air passage means for controlling the flow of ram air therethrough, a pneumatic actuator for controlling the position of said valve, means defining a vent orifice the effective size of which determines the operating pressure in said actuator and the position of said valve, first and second levers disposed in generally parallel relationship and pivotally supported at opposite ends, a pair of rollers arranged in side-by-side relationship between said levers and in engagement therewith so that when one of said levers is moved clockwise the other is moved counterclockwise, means responsive to cabin supply air pressure urging said levers in one direction, and means responsive to ram air pressure urging said levers in the opposite direction, one of said levers being operable to vary the effective size of said orifice whereby to position said valve in accordance with the ratio of ram air pressure to supply air pressure and thereby to regulate the ratio of ram air flow to cabin supply air flow in keeping with said pressure ratio.

9. In an aircraft air conditioning system wherein ram air is utilized to cool air which is supplied to the cabin, heat exchanger means adapted to transfer heat from the supply air for the cabin to the ram air which means includes air passage means adapted to receive a flow of ram air and to discharge said air, a valve movable in said air passage means for controlling the flow of ram air therethrough, a pneumatic actuator for controlling the position of said valve, means defining a vent orifice the effective size of which determines the operating pressure in said actuator and the position of said valve, first and second levers disposed in generally parallel relationship and pivotally supported at opposite ends, a pair of rollers connected to said actuator for movement therewith and arranged in side-by-side relationship between said levers and movable along the length of said levers and in engagement therewith so that when one of said levers is moved clockwise the other is moved counterclockwise, means responsive to cabin supply air pressure for urging said levers in one direction, and means responsive to ram air pressure for urging said levers in the opposite direction, one of said levers being operable to vary the effective size of said orifice whereby to position said valve in accordance with the ratio of ram air pressure to supply air pressure and thereby to regulate the ratio of ram air flow to cabin supply air flow in keeping with said pressure ratio and said rollers being moved by said actuator along said levers to balance the effective lever moments.

10. A ratio sensitive device comprising at least one lever supported for pivotal movement about a fixed axis, force means urging said lever in one direction, second force means urging said lever in an opposite direction, means movable along said lever for varying the point of application of said lever of a force exerted by only one of said force means, and means operable by said lever for adjusting the position of said movable means along the said lever whereby to balance the effective lever moments.

11. A fluid pressure ratio sensitive device comprising at least one lever supported for pivotal movement about a fixed axis, means responsive to a first fluid pressure for urging said lever in one direction, means responsive to a second fluid pressure for urging said lever in an opposite direction, means movable along said lever for varying the point of application to said lever of a force exerted by only one of said fluid pressure responsive means, and means operable by said lever for adjusting the position of said movable means along the said lever whereby to balance the effective lever moments.

12. A fluid pressure ratio sensitive device comprising a lever supported for pivotal movement about a fixed axis, a member movable transversely with respect to said lever extending generally parallel and in spaced relation therewith, means disposed between said lever and member and movable along said lever and member to effect an operative association therebetween whereby said member moves bodily in one direction when said lever moves clockwise and bodily in an opposite direction when said lever moves counterclockwise, means responsive to a first fluid pressure urging said lever and member in one direction, means responsive to a second fluid pressure urging said lever and member in the opposite direction, and means operable by said lever to adjust the position of said movable means along said lever and member whereby to balance the effective lever moments.

13. A fluid pressure ratio sensitive device comprising first and second levers supported for pivotal movement respectively about first and second fixed axes and operatively associated so that when one of said levers moves clockwise about its fixed axis the other of said levers moves counterclockwise about its fixed axis, means movable along the length of said levers effecting the operative association between said levers, means responsive to a first fluid pressure urging said levers in one direction, means responsive to a second fluid pressure urging said levers in the opposite direction, and means operable by one of said levers for adjusting the position of said movable means along the length of said levers whereby to balance the effective lever moments.

14. A fluid pressure ratio sensitive device comprising first and second levers disposed in generally parallel relationship and supported at opposite ends for pivotal movement about first and second fixed axes, said levers being operatively associated so that when one moves clockwise about its fixed axis the other moves counterclockwise about its fixed axis, means movable along the length of said levers effecting the operative association between said levers, means responsive to a first fluid pressure urging said levers in one direction, means responsive to a second fluid pressure urging said levers in the opposite direction, and means operable by one of said levers for adjusting the position of said movable means along the length of said levers whereby to balance the effective lever moments.

15. A fluid pressure ratio sensitive device comprising first and second levers disposed in generally parallel relationship and supported at opposite ends for pivotal movement about first and second fixed axes, a pair of rollers movable along the length of said levers and arranged in side-by-side relationship between said levers and in engagement therewith so that when one of said levers is moved clockwise about its axis the other is moved counterclockwise about its axis, means responsive to a first fluid pressure urging said levers in one direction, means responsive to a second fluid pressure urging said levers in the opposite direction, and means operable by one of said levers for adjusting the position of said rollers along the length of said levers whereby to balance the effective lever moments.

16. A fluid pressure ratio sensitive device comprising first and second levers disposed in generally parallel relationship and supported at opposite ends for pivotal movement about first and second fixed axes, a pair of rollers movable along the length of said levers and arranged in side-by-side relationship between said levers and in engagement therewith so that when one of said levers is moved clockwise about its axis the other is moved counterclockwise about its axis, a first bellows operable responsive to a first fluid pressure for urging said levers in one direction, a second bellows operable responsive to a second fluid pressure for urging said levers in the opposite direction, and means operable by one of said levers for adjusting the position of said rollers along the length of said levers whereby to balance the effective lever movements.

17. A fluid pressure ratio sensitive device comprising a lever at one end for pivotal movement about a fixed axis, first fluid pressure responsive means disposed on one side of said lever for urging same in one direction, second fluid pressure responsive means disposed on the opposite side of said lever for urging same in an opposite direction, a member carried by said second fluid pressure responsive means and extending generally parallel and in spaced relation with said lever, means disposed between said member and lever and movable along said member and lever for varying the point of application to said lever of the force exerted by said second fluid pressure responsive means, and means operable by said lever to adjust the position of said movable means along said lever and member whereby to balance the effective lever moments.

References Cited in the file of this patent
UNITED STATES PATENTS

| | | |
|---|---|---|
| 2,491,461 | Wood | Dec. 13, 1949 |
| 2,539,892 | Cook | Jan. 30, 1951 |
| 2,643,055 | Sorteberg | June 23, 1953 |
| 2,672,085 | Fischer | Mar. 16, 1954 |
| 2,675,818 | Gallo | Apr. 20, 1954 |
| 2,692,546 | Fischer | Oct. 26, 1954 |
| 2,860,650 | Schink | Nov. 18, 1958 |
| 2,910,084 | Frantz | Oct. 27, 1959 |